(12) United States Patent
Hou et al.

(10) Patent No.: US 11,332,313 B2
(45) Date of Patent: May 17, 2022

(54) CONVEYOR BELT MONITORING SYSTEM

(71) Applicant: The Yokohama Rubber Co., LTD., Tokyo (JP)

(72) Inventors: Gang Hou, Hiratsuka (JP); Masahiko Miyamoto, Hiratsuka (JP); Taro Takahashi, Hiratsuka (JP); Masaharu Manishi, Hiratsuka (JP); Eiji Kobayashi, Hiratsuka (JP); Hitoshi Indo, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 242 days.

(21) Appl. No.: 16/479,171

(22) PCT Filed: Nov. 24, 2017

(86) PCT No.: PCT/JP2017/042244
§ 371 (c)(1),
(2) Date: Jul. 18, 2019

(87) PCT Pub. No.: WO2018/135134
PCT Pub. Date: Jul. 26, 2018

(65) Prior Publication Data
US 2019/0352097 A1    Nov. 21, 2019

(30) Foreign Application Priority Data
Jan. 18, 2017 (JP) .............................. JP2017-006919

(51) Int. Cl.
*B65G 15/64* (2006.01)
*B65G 43/02* (2006.01)

(52) U.S. Cl.
CPC ............. *B65G 15/64* (2013.01); *B65G 43/02* (2013.01)

(58) Field of Classification Search
None
See application file for complete search history.

(56) References Cited

U.S. PATENT DOCUMENTS

| 6,988,610 B2* | 1/2006 | Fromme | B65G 43/02 198/502.1 |
| 8,755,589 B2* | 6/2014 | Sobczak | G06T 7/0004 382/152 |

(Continued)

FOREIGN PATENT DOCUMENTS

| CN | 201637472 | 11/2010 | |
| GB | 2410233 A * | 7/2005 | ............. B65G 15/64 |

(Continued)

OTHER PUBLICATIONS

International Search Report for International Application No. PCT/JP2017/042244 dated Feb. 6, 2018, 4 pages, Japan.

*Primary Examiner* — Kavel Singh
(74) *Attorney, Agent, or Firm* — Thorpe North & Western

(57) ABSTRACT

A conveyor belt monitoring system includes an imaging device which sequentially images a longitudinal predetermined range of a conveyor belt in running from above the conveyor belt. Image data captured by the imaging device is displayed in a monitor, and then is sequentially input into a control unit as detection data. The control unit causes a meander suppressing device to reduce a meander width of the conveyor belt on the basis of the image data.

10 Claims, 7 Drawing Sheets

(56) References Cited

U.S. PATENT DOCUMENTS

2010/0294624 A1    11/2010   Warner
2011/0050213 A1     3/2011   Furukawa

FOREIGN PATENT DOCUMENTS

| JP | S47-010287 | 10/1972 |
|----|------------|---------|
| JP | H05-054423 | 7/1993 |
| JP | H11-334852 | 12/1999 |
| JP | 2000-118663 | 4/2000 |
| JP | 2003-327317 | 11/2003 |
| JP | 2009-166947 | 7/2009 |
| WO | WO 2009/091019 | 7/2009 |
| WO | WO 2009/092130 | 7/2009 |

* cited by examiner

CONVEYOR BELT MONITORING SYSTEM

TECHNICAL FIELD

The present technology relates to a conveyor belt monitoring system and particularly relates to a monitoring system with high versatility, capable of accurately reducing a meander width, while sequentially determining a running state and a state of a conveying object at a desired position of a conveyor belt in its longitudinal direction.

BACKGROUND ART

Various objects, including mineral resources such as iron ore and limestone, are conveyed by a conveyor belt. The conveying objects are fed onto an upper cover rubber of the conveyor belt from a hopper or another conveyor belt. Tension acting on the conveyor belt varies due to a change of the conveying objects fed in terms of loaded weight, loaded position, and the like. Variation in the tension causes the conveyor belt to be likely to meander. Excessive meander width of the conveyor belt causes a conveying object to drop off and the conveyor belt to be damaged, so it is desirable to reduce the meander width.

A known method includes detecting a meander width of a conveyor belt with a non-contact sensor such as an ultrasonic sensor disposed on the side of a pulley, for example (refer to the paragraph [0002] and FIG. 8 of Japan Unexamined Patent Publication No. 2009-166947). Unfortunately, this method detects a meander width of the conveyor belt at the pulley, so a meander width at a desired position between pulleys with maximum meander width cannot be accurately determined.

Then, a monitoring system for accurately determining a meander state of a conveyor belt has been proposed (refer to the paragraphs [0007] to [0017], etc. in Japan Unexamined Patent Publication No. 2009-166947). The monitoring system proposed in the document is configured to detect a magnetic field from a magnet embedded in a conveyor belt with a magnetic field detection unit. Based on the detection of the magnetic field with the magnetic field detection unit, a meander state of the conveyor belt is determined. This requires a conveyor belt to be embedded with a magnet. Thus, the monitoring system cannot be applied to an existing conveyor belt. In addition, the magnetic field detection unit is disposed close to the magnet embedded in the conveyor belt, so that a meander state of the conveyor belt is detected on its return side with no loaded conveying object. Thus, a meander state of the conveyor belt at a desired position in its longitudinal direction cannot be accurately determined. In addition, a state of a conveying object loaded on the conveyor belt also cannot be determined.

SUMMARY

The present technology provides a monitoring system with high versatility, capable of accurately reducing a meander width while sequentially determining a running state and a state of a conveying object at a desired position of a conveyor belt in its longitudinal direction.

A conveyor belt monitoring system according to an embodiment of the present technology includes a meander detecting device that detects a meander width of a conveyor belt in running, a control unit that receives detection data acquired by the meander detecting device, and a meander suppressing device controlled by the control unit. The meander detecting device is an imaging device that sequentially images a longitudinal predetermined range of the conveyor belt from above, and includes a monitor in which image data imaged by the imaging device is displayed. The control unit receives the image data as the detection data to cause the meander suppressing device to reduce a meander width of the conveyor belt on the basis of the image data.

According to the present technology, the imaging device that sequentially images the longitudinal predetermined range of the conveyor belt from above as the meander detecting device is used to display the captured image data in the monitor. This enables a running state and a state of the conveying object at a desired position of the conveyor belt in its longitudinal direction to be sequentially determined with the image data displayed in the monitor.

The control unit causes the meander suppressing device to reduce a meander width of the conveyor belt on the basis of the image data. Accordingly, the present technology does not require a special processing to be applied to a conveyor belt, so the monitoring system has very high versatility to be easily applied to an existing conveyor belt. In addition, a meander width at a desired position of the conveyor belt in its longitudinal direction is determined to reduce the meander width, and thus causes an advantage in accurately suppressing the meander width.

DETAILED DESCRIPTION

A conveyor belt monitoring system according to embodiments of the present technology will be described below with reference to the drawings.

Figure 1:
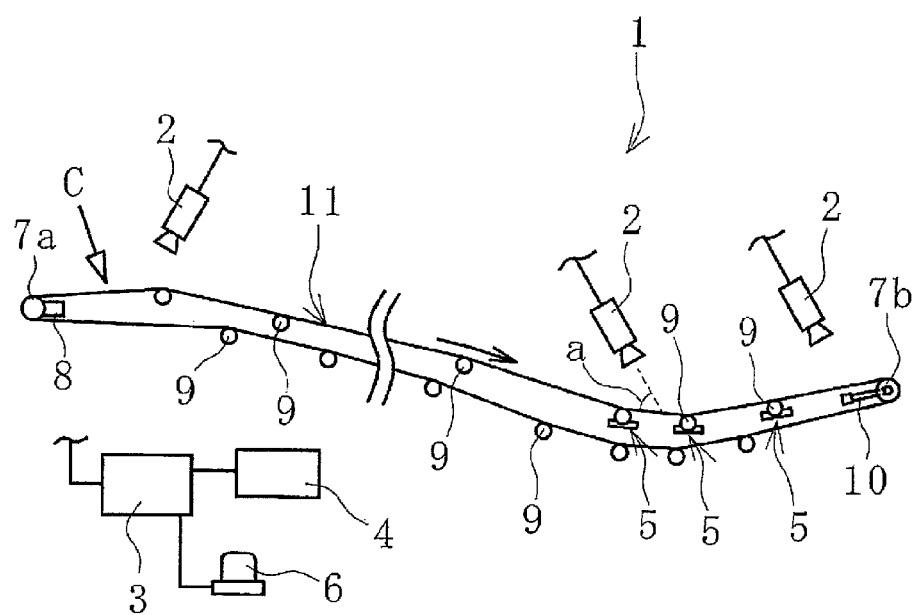
FIG. 1 is an explanatory diagram illustrating a conveyor belt line in side view to which a conveyor belt monitoring system of the present technology is applied.

A conveyor belt wear monitoring system 1 (hereinafter referred to as "system 1") of an embodiment of the present technology illustrated in FIG. 1 is to be applied to a conveyor belt 11 of a functioning conveyor belt line. In the system 1, a meander width Z is suppressed, and a running state of the conveyor belt 11 at a desired position in its longitudinal direction and a state of a conveying object C are sequentially determined. The meander width Z is a misalignment amount of the conveyor belt 11 in its lateral direction. The meander width Z is a numeric value indicating the extent of lateral displacement of the conveyor belt 11 with reference to the conveyor belt 11 in a state where the lateral center of the conveyor belt 11 is aligned with the lateral center of the conveyor belt line (normal state).

Figure 2:
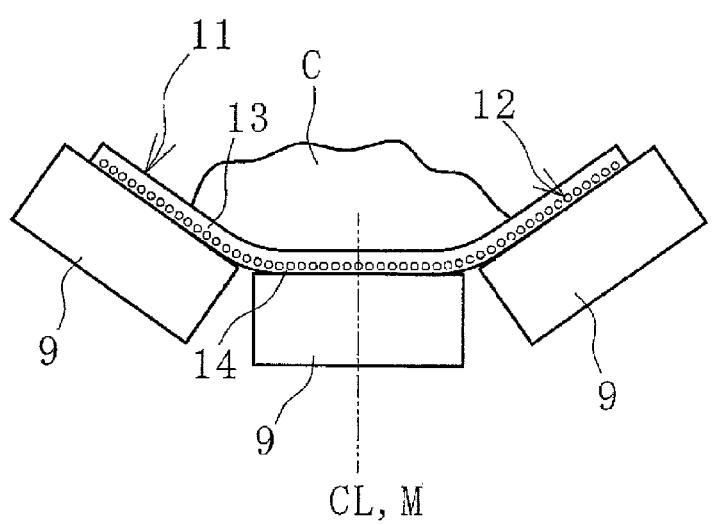
FIG. 2 is an explanatory diagram illustrating the conveyor belt of FIG. 1 on a carrier side with a cross-section thereof in a width direction.

As illustrated in FIG. 2, the conveyor belt 11 monitored by the system 1 includes a core layer 12 formed of canvas or steel cords, and an upper cover rubber 13 and a lower cover rubber 14 that sandwich the core layer 12 therebetween. The core layer 12 bears the tension when the conveyor belt 11 is stretched and mounted. The conveyor belt 11 may include additional necessary members as appropriate. In FIG. 2, the lateral center line of the conveyor belt 11 is indicated as a dot-dash line CL, and the lateral center line of the conveyor belt line is indicated as a dot-dash line M.

The conveyor belt 11 is stretched and mounted at a predetermined tension on a drive pulley 7a and a driven pulley 7b. Between the drive pulley 7a and the driven pulley 7b, the conveyor belt 11 is supported by support rollers 9 disposed at appropriate intervals in the belt longitudinal direction.

On a carrier side of the conveyor belt 11, the lower cover rubber 14 is supported by the support rollers 9 disposed at predetermined positions spaced apart in the longitudinal direction of the conveyor belt 11. On a return side of the conveyor belt 11, the upper cover rubber 13 is supported by the support rollers 9 disposed at predetermined positions spaced apart in the longitudinal direction of the conveyor belt 11.

On the carrier side, three support rollers 9 are disposed side by side in the belt lateral direction at respective predetermined positions spaced apart in the longitudinal direction of the conveyor belt 11. The conveyor belt 11 is supported by the support rollers 9 in a recessed shape having a predetermined trough angle.

The drive pulley 7a is rotationally driven by a drive motor 8, and the conveyor belt 11 runs in one longitudinal direction using the rotation of the drive pulley 7a. A take-up mechanism 10 moves the driven pulley 7b to apply tension to the conveyor belt 11 (core layer 12) by changing a distance between the drive pulley 7a and the driven pulley 7b.

In the embodiment, the conveyor belt 11 has a form in which it is once inclined downward in the middle of running from the drive pulley 7a to the driven pulley 7b and then inclined upward. That is, the conveyor belt line has a lowermost point at its intermediate position. The present technology can be applied to the conveyor belt line not only in the form as described above but also in various forms. For example, the present technology can be also applied to a conveyor belt line in a form of a uniformly downward inclination, a form of a uniformly upward inclination, or a flat form.

The system 1 includes at least one imaging device 2 such as a digital video camera, serving as a meander detecting device that detects a meander width of the conveyor belt 11 in running. The system 1 also includes a control unit 3, a monitor 4, and a meander suppressing device 5. In addition, the system 1 of the embodiment includes a warning device 6. Examples of the warning device 6 include a warning light, an alarm, and the like.

The control unit 3 is configured to use a computer and the like. The control unit 3 is connected to the imaging device 2, the monitor 4, the meander suppressing device 5, the warning device 6, and the drive motor 8 via wired or wireless. The control unit 3 controls operation of the meander suppressing device 5, the warning device 6, and the drive motor 8.

The imaging devices 2 each sequentially image a longitudinal predetermined range of the conveyor belt 11 from above. All of the imaging devices 2 of the embodiment are disposed on the carrier side of the conveyor belt 11. Specifically, the imaging devices 2 are each disposed at a position at which the conveying object C is fed onto the conveyor belt 11, a lowermost position of the conveyor belt line conveyor, having the maximum tension change in the conveyor belt 11, and a position near the driven pulley 7b. Image data captured by the imaging device 2 is sequentially input into the control unit 3 as detection data. The image data is also sequentially displayed in the monitor 4.

An angle a formed by the surface of the upper cover rubber 13 of the conveyor belt 11 and an imaging direction of each one of the imaging devices 2 is set at 30° or more and 90° or less, for example. In the embodiment, the angle a is set at about 45°.

The meander suppressing device 5 functions to reduce the meander width Z of the conveyor belt 11. The meander suppressing device 5 of the embodiment is provided below the support rollers 9 disposed at three consecutive places spaced apart in the longitudinal direction of the conveyor belt 11 on the carrier side of the conveyor belt 11.

Figure 3:
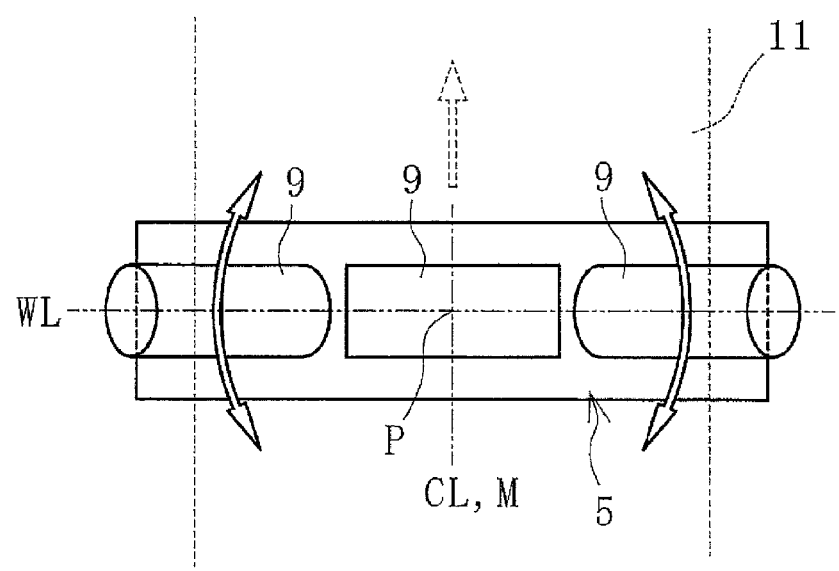
FIG. 3 is an explanatory diagram illustrating a meander suppressing device of FIG. 1 in a plan view.

As illustrated in FIG. 3, the meander suppressing device 5 includes a movable mount that inclines the support rollers 9 on the carrier side in the lateral direction of the conveyor belt 11 in a plan view. In FIG. 3, the axis of the support rollers 9 is indicated by the dot-dash line WL. The meander suppressing device 5 is turned around an intersection P of the axis WL and the lateral center line M of the conveyor line to incline the support rollers 9 in the lateral direction of the conveyor belt 11 in a plan view.

Figure 4:
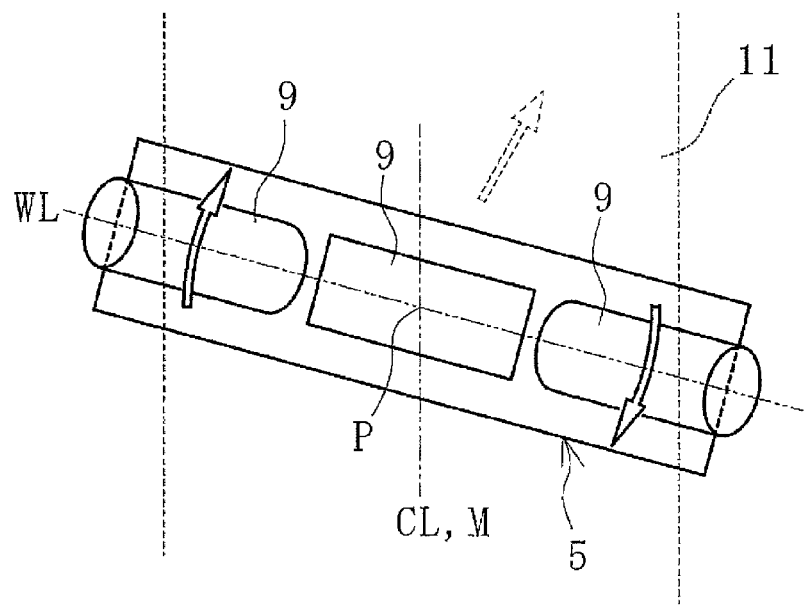
FIG. 4 is an explanatory diagram illustrating the meander control means of FIG. 3 in operation in a plan view.

As illustrated in FIG. 4, when the meander suppressing device 5 is turned clockwise around the intersection P, the support rollers 9 are inclined such that its left side becomes the front in the lateral direction of the conveyor belt 11 in a plan view. This applies external force to the conveyor belt 11 that is running in which the external force causes the conveyor belt 11 to be displaced right in its running direction. Thus, when the conveyor belt 11 meanders left in the running direction, the meander width Z can be reduced by controlling the meander suppressing device 5 as described above.

When the conveyor belt 11 meanders right in the running direction, the meander suppressing device 5 is turned counterclockwise around the intersection P. This causes the support rollers 9 to be inclined such that its right side becomes front in the lateral direction of the conveyor belt 11 in a plan view. As a result, external force is applied to the conveyor belt 11 that is running in which the external force causes the conveyor belt 11 to be displaced left in its running direction, so the meander width Z can be reduced.

In this embodiment, while all of the three support rollers 9 arrayed in the belt lateral direction can be inclined in the lateral direction of the conveyor belt 11 in a plan view, the present technology is not limited to this structure. For example, only the support rollers 9 disposed at respective ends in the belt lateral direction can be inclined in the lateral direction of the conveyor belt 11 in a plan view by the meander suppressing device 5.

Next, a method for monitoring the conveyor belt 11 running using the system 1 will be described.

In the conveyor belt line, the conveying object C is fed onto the upper cover rubber 13 using a hopper or the like, for example, while the conveyor belt 11 is run. Each one of the imaging devices 2 sequentially images a longitudinal predetermined range of the passing conveyor belt 11 from above, and captured image data is input into the control unit 3.

Figure 5:
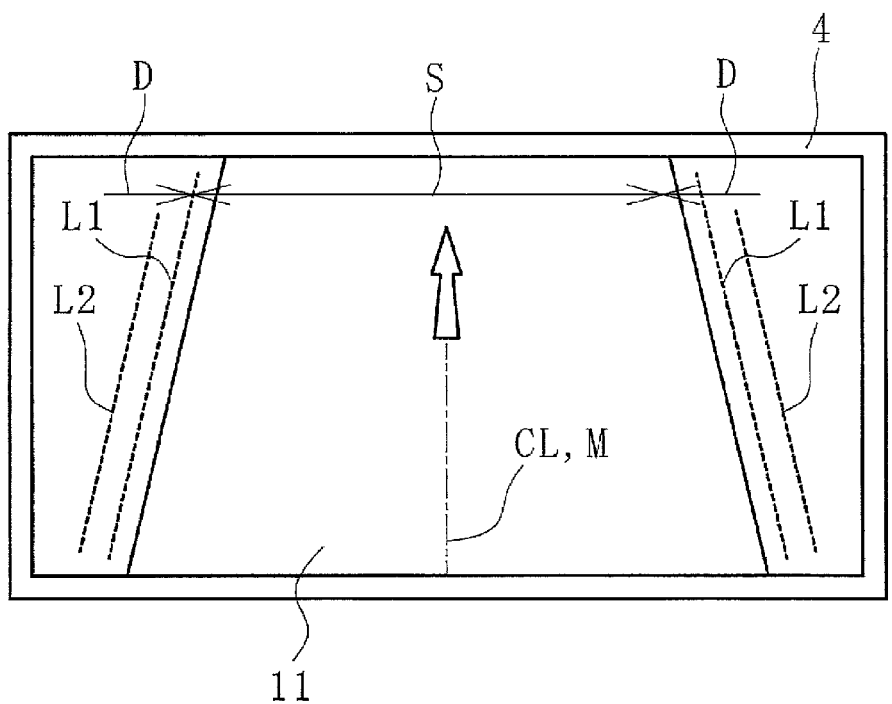
FIG. 5 is an explanatory diagram illustrating image data on a conveyor belt (when existing in a normal range) imaged by an imaging device.
Figure 6:
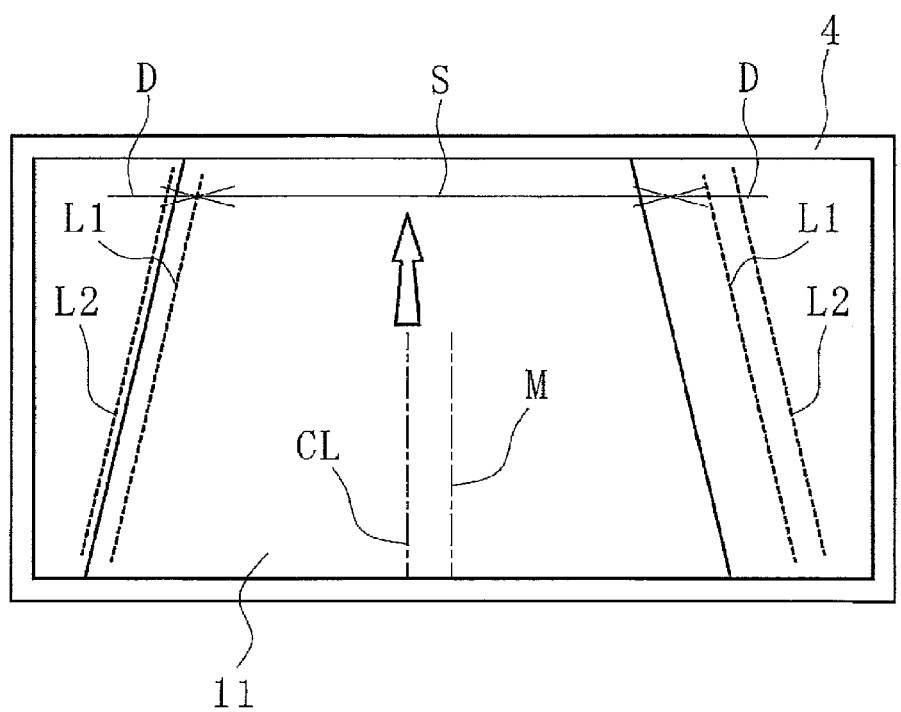
FIG. 6 is an explanatory diagram illustrating image data on a conveyor belt (when existing in an abnormal range) imaged by the imaging device.
Figure 7:
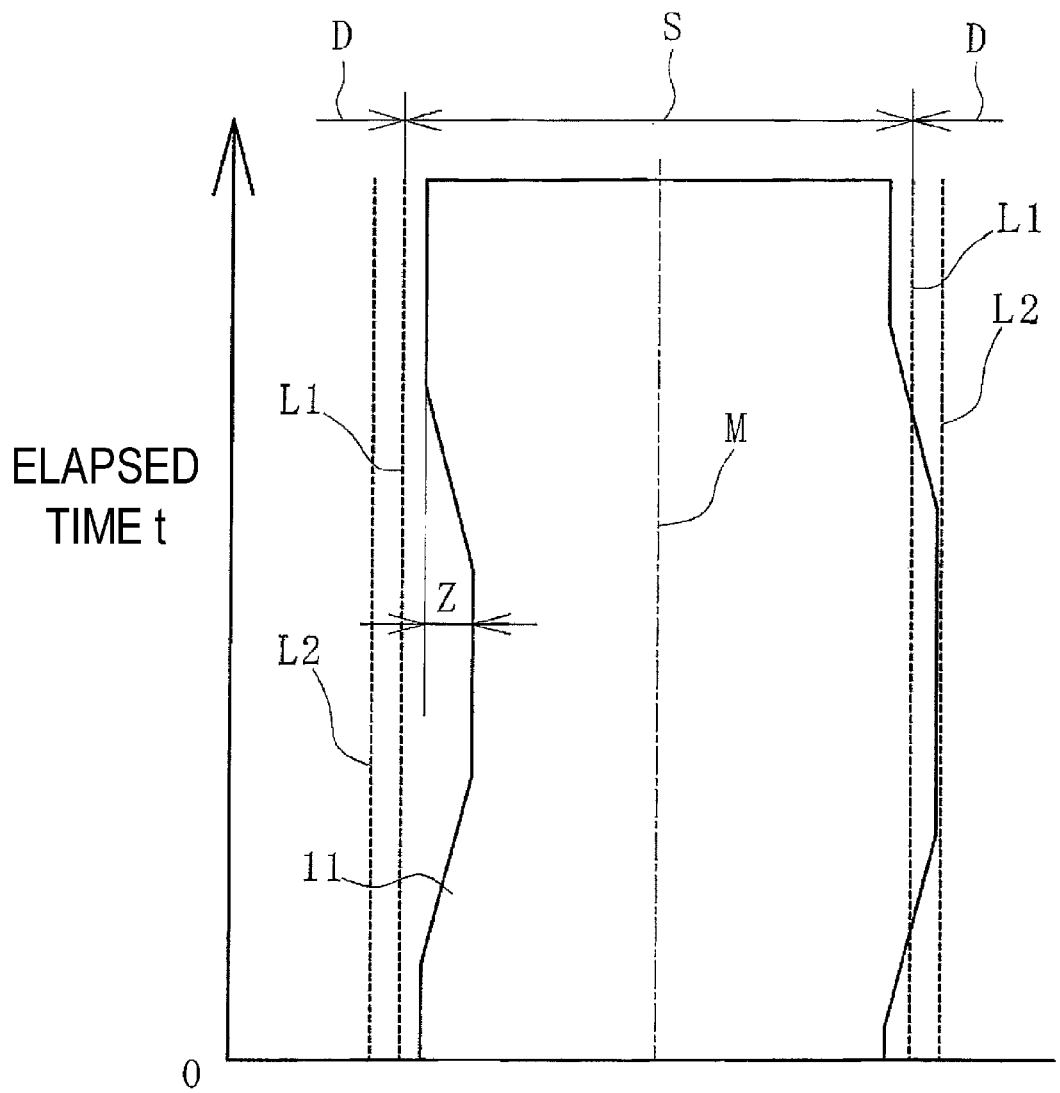
FIG. 7 is an explanatory graph showing a change with time in meander width of a conveyor belt imaged by the imaging device in a plan view.

As illustrated in FIGS. 5 and 6, the monitor 4 displays image data captured by each one of the imaging devices 2 in real time. The arrow in each of FIGS. 5 and 6 indicates a running direction of the conveyor belt 11. The control unit 3 stores image data illustrated in FIG. 7. FIGS. 5 to 7 each display a first warning line L and a second warning line L2, extending in the longitudinal direction of the conveyor belt 11, outside each of the lateral ends of the conveyor belt 11. The lines L and L2 are each set at a position separated laterally from the lateral center line M of the conveyor belt line by a predetermined distance.

When the angle a formed by the surface of the upper cover rubber 13 of the conveyor belt 11 and an imaging direction of each one of the imaging devices 2 is reduced, a imaging longitudinal predetermined range increases and the conveyor belt 11 is imaged in a tapered image as illustrated in FIGS. 5 and 6. Thus, the angle a is set to from 30° to 90°, and more preferably is set to from 45° to 90°.

When the conveyor belt 11 exists in a region between the first warning lines L, the meander width Z can be said to be small. Thus, the region is stored in the control unit 3 as a normal range S of a meander width. When the conveyor belt 11 exists in a region outside the normal range S, the meander width Z can be said to be large. Thus, the region is stored in the control unit 3 as an abnormal range D.

In the image data illustrated in FIG. 5, the lateral center line CL of the conveyor belt 11 is substantially aligned with the lateral center line M of the conveyor belt line, causing the meander width Z to be close to zero. That is, the conveyor belt 11 exists in the normal range S, so the control unit 3 determines that the meander width Z is small in a normal state. Thus, as illustrated in FIG. 3, the control unit 3 maintains a state where the axis WL of the support rollers 9 is orthogonal to the lateral center line CL of the conveyor belt 11 without operating the meander suppressing device 5.

In the image data illustrated in FIG. 6, the lateral center line CL conveyor belt 11 is greatly displaced left from the lateral center line M of the conveyor belt line to cause the meander width Z to be large. That is, the conveyor belt 11 exists in the abnormal range D, so that the control unit 3 determines that the meander width Z is large in an abnormal state. Thus, as illustrated in FIG. 4, the control unit 3 operates the meander suppressing device 5 to incline the axis WL of the support rollers 9 from the lateral center line CL of the conveyor belt 11. This causes the conveyor belt 11 to be displaced right to reduce the meander width Z.

FIG. 7 shows a change with time in meander width Z. The graph of FIG. 7 shows a lower end indicating an updated state (meander width Z) of the conveyor belt 11 running, and shows a more previous state upward. The monitor 4 also can display change with time in meander width Z as shown in FIG. 7.

As described above, in the embodiments of the present technology, the control unit 3 causes the meander suppressing device 5 to reduce the meander width Z on the basis of image data captured by the imaging devices 2. To reduce the meander width Z using the meander suppressing device 5, another method can be employed other than the above-mentioned control method. For example, operation of the meander suppressing device 5 can be controlled such that the lateral center line M of the conveyor belt line always aligns with the lateral center line CL of the conveyor belt 11.

Using the system 1 of the embodiments of the present technology enables a supervisor or the like at job site to sequentially determine a running state of the conveyor belt 11 and a state of the conveying object C at a desired position by visually checking image data displayed in the monitor 4. This enables estimating that an increase in meander width Z is caused by displacement of a loaded position of the conveying object C, for example.

The embodiments of the present technology do not require special processing for embedding a magnet in the conveyor belt 11, or the like, and thus can be easily applied also to an existing conveyor belt. This achieves a monitoring system with very high versatility.

In addition, the system 1 of the embodiments of the present technology enables a longitudinal predetermined range to be imaged by the imaging devices 2 to be set at a desired position. This enables the meander width Z to be reduced by determining the meander width Z of the conveyor belt 11 at a desired position in its longitudinal direction. That is, this enables a state of the conveyor belt 11 at a position at which the conveyor belt line has the maximum meander width Z to be monitored to accurately suppress the meander width Z at the position.

The longitudinal predetermined range of the conveyor belt 11 imaged by the imaging devices 2 is set in accordance with a variation of tension acting on the conveyor belt 11 in running, for example. In this case, the tension acting on the conveyor belt 11 in running is preliminarily measured at multiple positions of different longitudinal positions of the conveyor belt 11. Then, the range to be imaged is set to include a position with the largest variation of tension of the measured positions. The position with the largest variation of tension tends to have the maximum meander width Z. This enables image data on the conveyor belt 11 at a position with the maximum meander width Z to be imaged by setting the range to be imaged by the imaging devices 2 as described above.

In the embodiments, when the control unit 3 determines that the conveyor belt 11 exists in the abnormal range D, the control unit 3 causes the warning device 6 to operate to notify a supervisor or the like at job site that the meander width Z of the conveyor belt 11 increases. For example, the abnormal range D can be separated into a region (initial warning region) between the second warning lines L2, and a region (important warning region) outside the region between the second warning lines L2. When the conveyor belt 11 exists in the important warning region, the meander width Z is said to be larger than that when the conveyor belt 11 exists in the initial warning region. Then, the former case and the latter case each have a different method (type) of warning with the warning device 6. For example, when the conveyor belt 11 exists in the important warning region, a warning sound is increased more in volume than when the conveyor belt 11 exists in the initial warning region to alert a supervisor or the like more strongly.

When the control unit 3 determines that the conveyor belt 11 continuously exists in the abnormal region D for a predetermined time in image data, the control unit 3 also can stop the conveyor belt 11 from running. When the control unit 3 determines as described above, it is conceivable that the meander suppressing device 5 does not serve to sufficiently suppress the meander width Z. Thus, the conveyor belt 11 is stopped so that the conveyor belt line is inspected in detail.

The invention claimed is:

1. A conveyor belt monitoring system comprising:
   a meander detecting device that detects a meander width of a conveyor belt in running;
   a control unit that receives detection data acquired by the meander detecting device; and
   a meander suppressing device controlled by the control unit;
   the meander detecting device being an imaging device that sequentially images a longitudinal predetermined range of the conveyor belt from above, and comprising a monitor in which image data captured by the imaging device is displayed; and the control unit receiving the image data as the detection data to cause the meander suppressing device to reduce a meander width of the conveyor belt on a basis of the image data, wherein an imaging direction of the imaging device is set to be inclined in a longitudinal direction of the surface of the conveyor belt and the image data is imaged in a tapered image.

2. The conveyor belt monitoring system according to claim 1, wherein a plurality of the imaging devices are disposed at a positions spaced apart from each other in a longitudinal direction of the conveyor belt.

3. The conveyor belt monitoring system according to claim 1, wherein a normal region where the conveyor belt exists when the meander width is within an allowable range, and an abnormal region where the conveyor belt exists when the meander width is out of the allowable range are preliminarily set;

the control unit receives region position data on the normal region and the abnormal region; and the control unit causes the meander suppressing device to reduce the conveyor belt in meander width when the control unit determines that the conveyor belt exists in the abnormal region in the image data.

4. The conveyor belt monitoring system according to claim 3, further comprising a warning device that issues a warning by instruction of the control unit when the control unit determines that the conveyor belt exists in the abnormal region in the image data.

5. The conveyor belt monitoring system according to claim 3, wherein when the control unit determines that the conveyor belt continuously exists in the abnormal region for a predetermined time in the image data, the control unit stops the conveyor belt from running.

6. The conveyor belt monitoring system according to claim 1, wherein a longitudinal predetermined range of the conveyor belt to be imaged by the imaging device is set in accordance with a variation of tension acting on the conveyor belt in running and to include a position with a largest variation of the tension.

7. The conveyor belt monitoring system according to claim 2, wherein a normal region where the conveyor belt exists when the meander width is within an allowable range, and an abnormal region where the conveyor belt exists when the meander width is out of the allowable range are preliminarily set;

the control unit receives region position data on the normal region and the abnormal region; and the control unit causes the meander suppressing device to reduce the conveyor belt in meander width when the control unit determines that the conveyor belt exists in the abnormal region in the image data.

8. The conveyor belt monitoring system according to claim 7, further comprising a warning device that issues a warning by instruction of the control unit when the control unit determines that the conveyor belt exists in the abnormal region in the image data.

9. The conveyor belt monitoring system according to claim 8, wherein when the control unit determines that the conveyor belt continuously exists in the abnormal region for a predetermined time in the image data, the control unit stops the conveyor belt from running.

10. The conveyor belt monitoring system according to claim 9, wherein a longitudinal predetermined range of the conveyor belt to be imaged by the imaging device is set in accordance with a variation of tension acting on the conveyor belt in running and to include a position with a largest variation of the tension.

* * * * *